Jan. 2, 1951 W. W. KEMP ET AL 2,536,609
INK DRYING BURNER
Filed Dec. 8, 1945 3 Sheets-Sheet 1
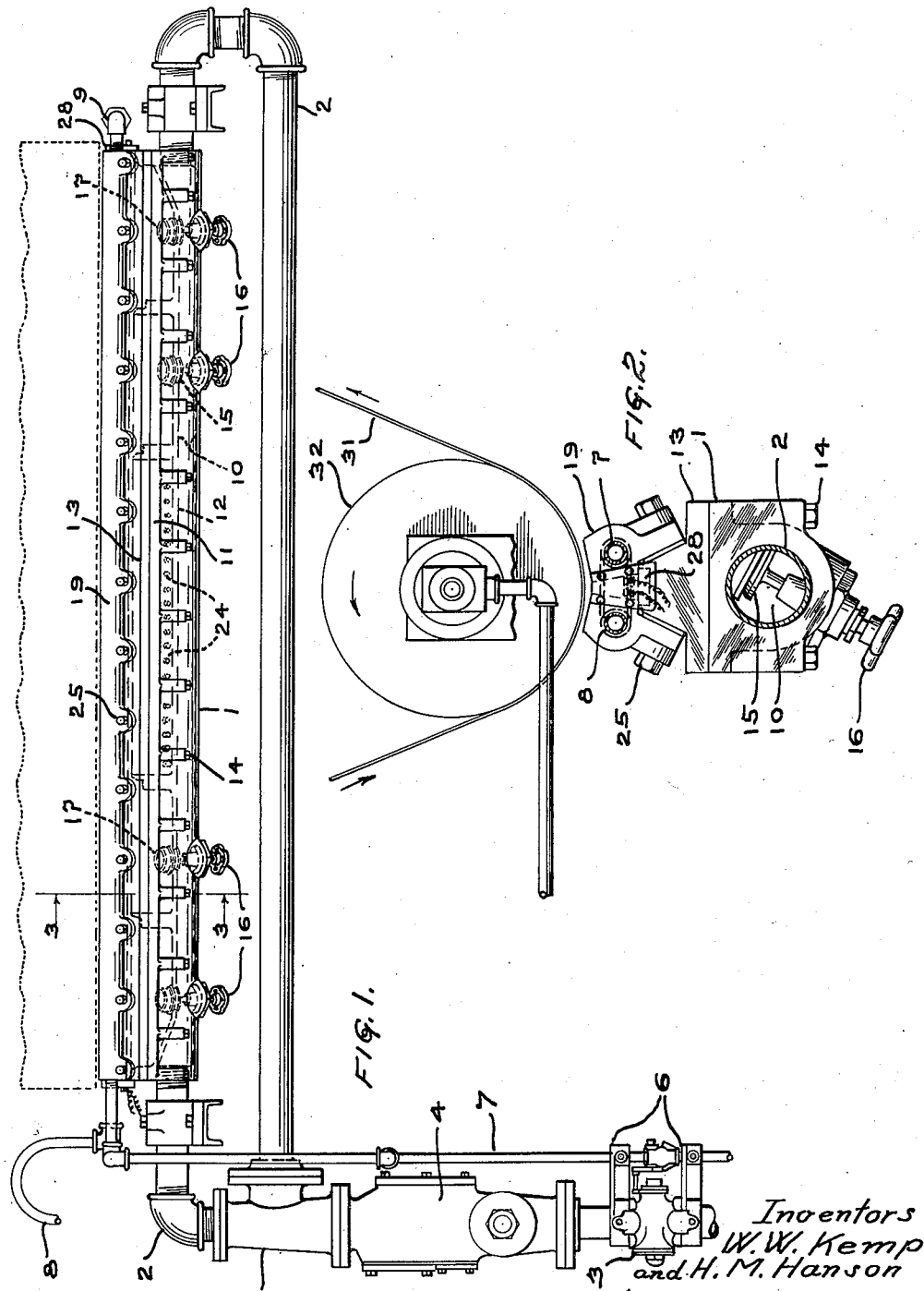
Inventors
W.W. Kemp
and H.M. Hanson
BY Thomas W. Y. Clark
Attorney Jan. 2, 1951 W. W. KEMP ET AL 2,536,609
INK DRYING BURNER Filed Dec. 8, 1945 3 Sheets—Sheet 2

Inventors
W. W. Kemp
H. M. Hanson
BY Thomas W. Clark
Attorney

Inventors
W. W. Kemp and
H. M. Hanson
By Thomas W. J. Clark
ATTORNEY.

Patented Jan. 2, 1951

2,536,609

UNITED STATES PATENT OFFICE 2,536,609

INK DRYING BURNER

William Wallace Kemp and Hartwig Millard Hanson, Baltimore, Md., assignors to The C. M. Kemp Manufacturing Company, Baltimore, Md., a corporation of Maryland Application December 8, 1945, Serial No. 633,730

8 Claims. (Cl. 158—105)

This invention relates to a burner for drying ink in connection with presses for printing newspapers and magazines and for drying coatings on paper or other running webs.

The ink now used on such printing presses is of the flash drying variety containing volatiles many of which are combustible. The presses often superimpose one color on top of another, using from two to five or more colors, even in the printing of newspapers. The speed at which the press can be operated has been limited by the speed at which the ink can be dried; the burner of this invention permits that speed to be greatly increased. Many types of heaters and gas burners have been employed including blasts of heated air, steam heated drums, open or ribbon flame gas burners, radiant heat gas burners and various infra-red heaters, many of the heaters so drying the paper that its tensile strength is impaired.

The object of the instant burner is to dry the ink in a fraction of a second and to maintain the coolness of the burner and paper support at all times so that the burner will not be overheated by its own heat and the moisture will not be driven from the paper and its tensile strength will not be impaired.

The burner of this invention compresses the flame between the burner and the paper to smooth the flame and rub it against the ink at the places of compression to dry the ink quicker and the compression also dissipates air that might travel with the paper.

The burner of this invention may also be used to dry coatings placed on strip materials passed around a drum partly submerged in a coating solution, the strip, so coated on one side, would then be passed around the roller hereinafter described and dried by the burner.

The flame partially surrounds the web on both sides of the burner, and on the leading-in side would preheat the ink or coating and drive off any surplus coating.

The burner employs an air-gas mixture produced by the Kemp industrial carburetor described in United States Patent No. 1,880,141. This carburetor is equipped to feed to the burner just enough air to completely burn the gas supplied to the carburetor at any predetermined pressure. In the use of the burner it is preferred that the gas be supplied thereto between a pressure of 24 ounces to 48 ounces per square inch, and the flame is directed against the web at a correspondingly high pressure. The complete air gas mixture produces a flame of maximum heat for the gas employed.

Other objects and advantages of the invention will be apparent from the following description and the accompanying drawings in which:

Figure 1 is a side elevation of the burner with its closely related feeding and cooling mechanism.

Figure 2 is an end view thereof.

In the drawings similar numerals refer to similar parts throughout the several views.

Figure 3:
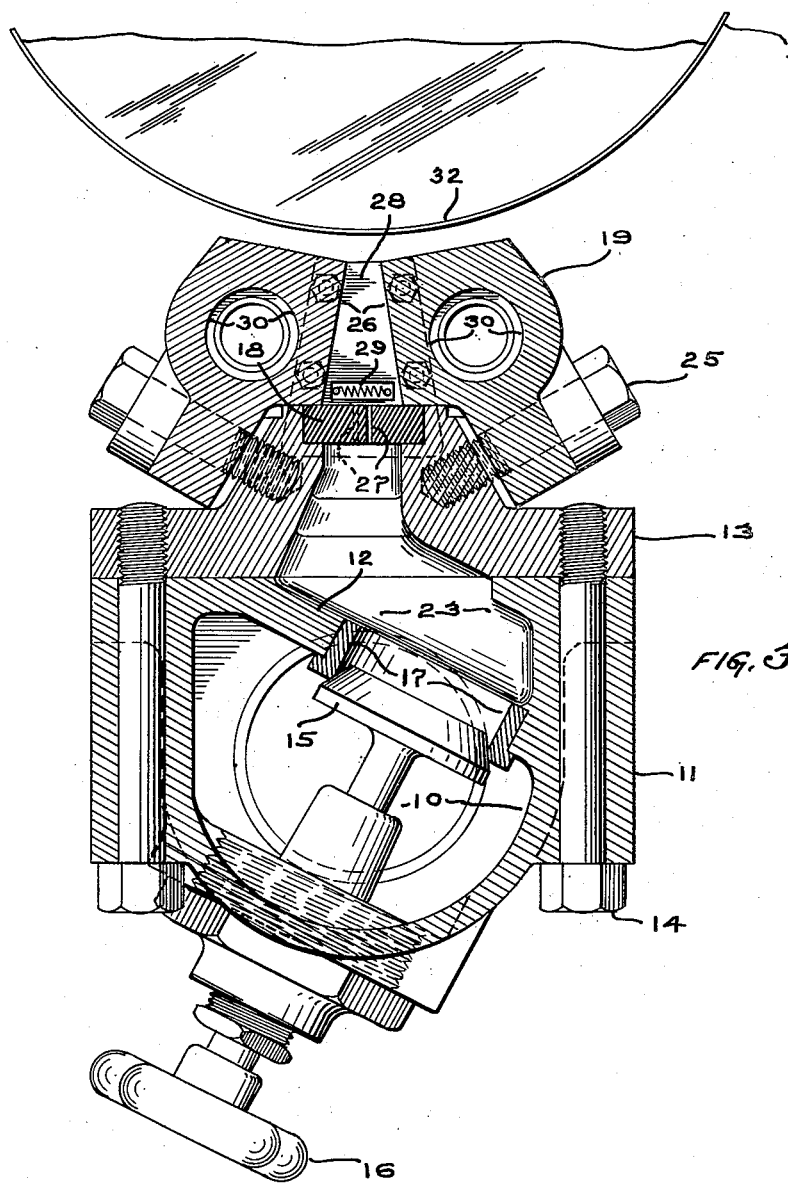
Figure 3 is a transverse sectional view thereof on line 3—3 of Figure 1.
Figure 4:
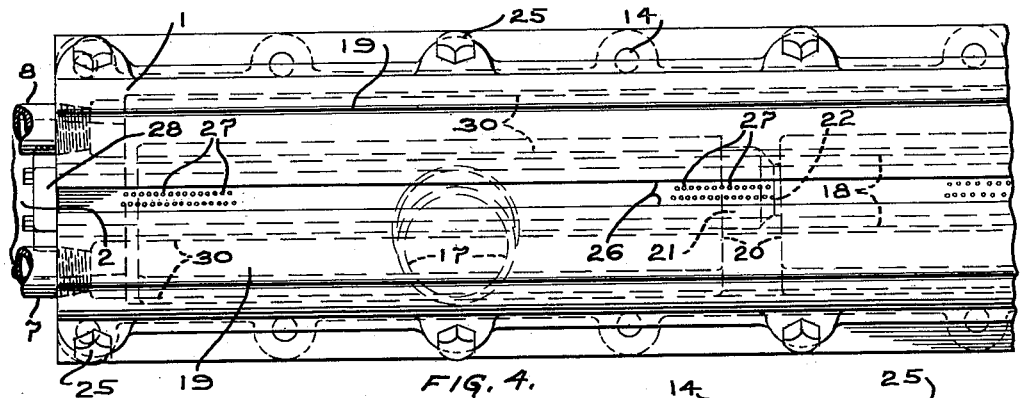
Figure 4 is a top plan view of a portion of the burner from the left end.
Figure 5:
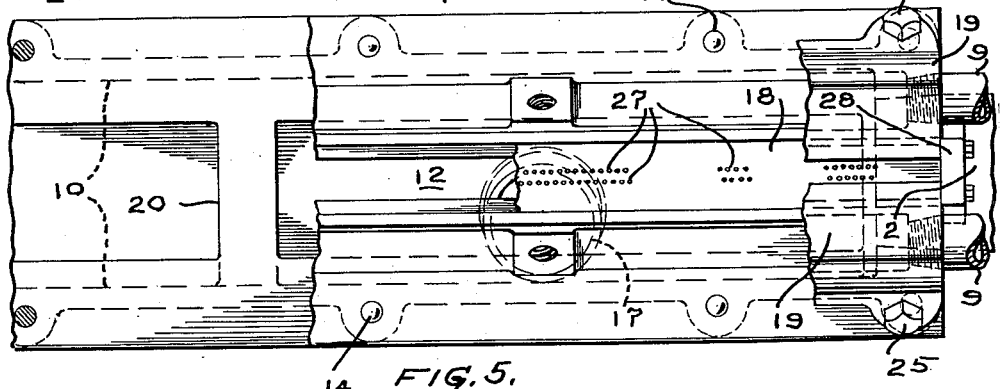
Figure 5 is a similar view from the right end showing portions broken away.
Figure 6:
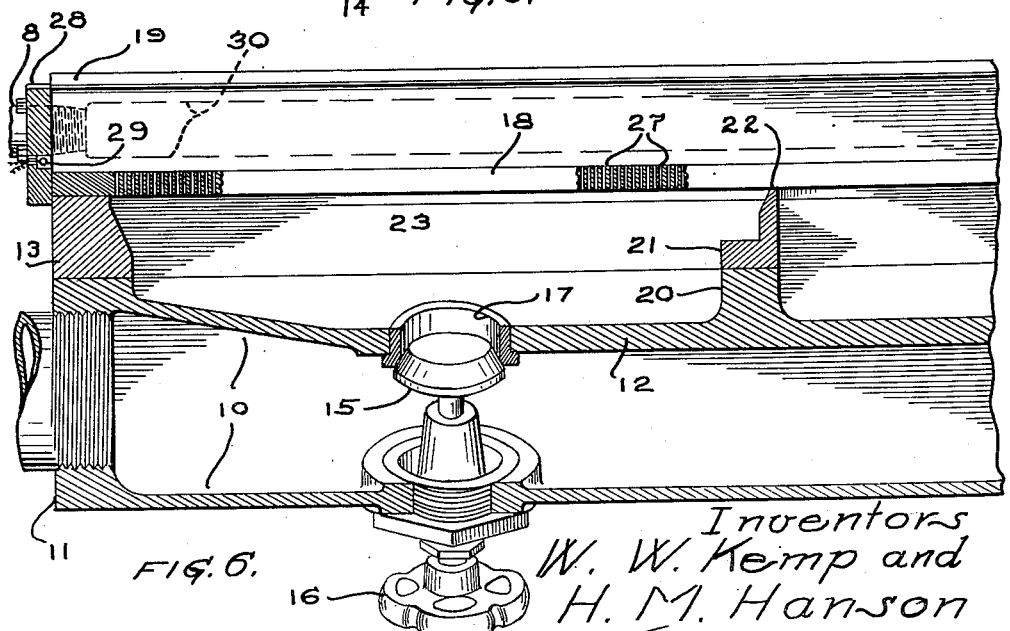
Figure 6 is a longitudinal sectional view of the right hand end of the burner.

The burner 1 is fed from both ends by pipes 2 with a completely combustible mixture of air and gas from a carburetor of the type of the Kemp industrial carburetor described in United States Patent No. 1,880,141. This completely combustible mixture is fed through pipes to the index cock 3 and through the fire check 4 to the T 5 to which the pipes 2 are connected. Connecting the pipes 2 at both ends not only distributes the pressure across the manifold, but also delivers the maximum pressure to the burner face.

Cooling water for the burner is also fed through valve 6 operated simultaneously with cock 3 and through pipe 7 to one side of the burner 1 and from the other side of the burner there is a water outlet 8. A connection 9 passes the water from one side of the burner to the other at the other end of the burner.

The air gas mixture fed to the burner proper at both ends enters the manifold or gas chamber 10. The lower part of the burner is composed of two sections, the lower 11 having in it a partition 12 and the upper section 13. These two long extending sections are bolted together by means of bolts 14. The lower section 11 has therein a plurality of valves 15 operated from outside by handles 16. These valves close openings 17 in the partition 12. As shown there are four of these valves.

The top of section 13 is shaped to receive orifice plate 18. This orifice plate 18 is held down in the space provided in section 13 by the longitudinally extending combustion chamber forming members 19. Section 11 has a plurality of integral partitions 20 and section 13 has corresponding partitions 21 integral with it. These partitions 21 contact the plate 18 with substantially a knife edge as shown at 22 so that the valves 15 may be opened to feed gas from the manifold 10 to the intermediate chamber 23, formed by the sections 11 and 13, in separate compartments. The center compartment between the two central partitions is always fed by small openings 24 in the partition 12. The end compartments are only fed when the valves 15 are open. The arrangement allows the adjustment of the burner to three different widths and the combined air gas mixture is always fed from both ends of the burner to equalize the pressure in the gas chamber or manifold 10.

The combustible mixture is fed with maximum pressure through openings 17, and as it comes through at right angles to partition 12, it strikes the opposite wall of intermediate chamber 23, formed by sections 11 and 13, and flattens out, spreading with equal pressure throughout the compartment of the chamber 23, so that the pressure on plate 18 is even, for all the orifices thereof.

The members 19 are bolted to the section 13 by bolts 25 and when they are fastened down tight they hold the plate 18 firmly in its seat. For any servicing of the burner the members 19 can either one be taken off quite readily. Their adjacent faces, together with the orifice plate 18, form the combustion chamber 26. The plate 18 has in it two rows of alternately spaced orifices 27.

The area of the openings 17 is greater than the area of the openings or orifices 27 so that a constant, evenly distributed volume of the combustible mixture is back of orifices 27 and it is always under pressure.

At the end of the combustion chamber are small plates 28 bolted to the members 19 to completely close the combustion chamber 26 at the ends. In one or both of these end members 28 and counter-sunk back in a small opening is a small heated coil 29. This is constantly heated but being countersunk is out of the path of the flame from the orifices 27. The gas on its first inrush into the burner contacts the coil 29 and is ignited by the coil. The plate 18 is preferably made of a rust proof composition to prevent the choking or rusting of the orifices 27.

The members 19 are hollow longitudinally to form a passage 30 for the water fed to them by pipe 7, cross pipe 9 and having the outlet 8.

The paper 31 to be dried is passed around the liquid cooled drum 32 in close proximity to the burner preferably approximately one-fourth of an inch from a horizontal line across the burner opening. The top of members 19 slope toward the burner opening to form a broad V-shaped face to the burner. The flame has its point of greatest heat intensity at the point of contact with the paper. The faces of the members 19 are nearer to the paper at the approximate center of each member 19 than is the burner at its center, at the point of flame contact. This narrowing or constricting of the flame as it tends to expand to each side of the burner and to each side of the paper compacts the flame at both sides, squeezes it, to give it a close rubbing effect. Such small flame divisions as might still possibly exist because of the flame being initially composed of a plurality of small flames are mashed flat by this compression so that the flame contacting the paper is completely flat and void of any lines that might cause streaking of the ink or scorching streaks of heat upon the paper or ink. The flame leaves the burner as a stiff blast flame of a width to approximately fill the space between the members 19. The flame is under high pressure and the pressure of the flame and its compression between the burner and paper dissipate any film of air that might naturally travel with the paper. The paper is driven at such a fast speed that the contact of the flame with the paper is so brief as not to dry the paper; and whereas several burners have heretofore been required to dry the ink, one of the structure of this invention has been found adequate for each side of the sheet. The burner of this invention likewise prevents burner whistles and squeals and allows for the delivery of the paper at its maximum physical condition.

The flame passes around the paper, on both sides of the roller 32, and preheats the ink or coating on the leading-in side, and the flame has such pressure as to blow away any surplus coating material when it is used to dry coated webs.

The cooling of members 19 prevents the flame from overheating the burner, and the web does not usually extend to the ends of the roller 32, so that the cooling of that roller not only keeps the web cool but also keeps the ends of the roller cool when they are exposed to the flame.

The maximum efficiency of the burner is obtained at pressures of approximately 48 ounces per square inch, and the efficiency of the burner is such that the fuel consumption is less for the same drying effect.

The operation of the burner and its advantages will be apparent from the above description. It is likewise apparent that many modifications may be made in the burner and the means for feeding the combustible mixture without departing from the invention.

What is claimed as new and is desired to be secured by Letters Patent is:

1. A burner for drying additions to a running web comprising elongated sections and means to connect said sections together forming a closed body with a longitudinally extending flame orifice, said body having therein a fuel chamber, an intermediate chamber and a combustion chamber having said orifice therein, said body forming walls for said chambers; an orificed partition between said fuel chamber and intermediate chamber, an orifice plate between said intermediate chamber and combustion chamber, said partition being angularly disposed with respect to said plate, one wall of said intermediate chamber comprising a baffle extending longitudinally continuously and transversely substantially between said angularly disposed partition and plate to break the direction of the line of flow of fuel between the orifices in the partition and plate.

2. A burner for drying additions to a running web comprising elongated sections and means to connect said sections together forming a closed body with a longitudinally extending flame orifice, said body having therein a fuel chamber, an intermediate chamber and a combustion chamber having said orifice therein, said body forming walls for said chambers; an orificed partition between said fuel chamber and intermediate chamber, an orifice plate between said intermediate chamber and combustion chamber, said partition being angularly disposed with respect to said plate, one wall of said intermediate chamber comprising a baffle extending longitudinally continuously and transversely substantially between said angularly disposed partition and plate to break the direction of the line of flow of fuel between the orifices in the partition and plate, two of said sections forming the combustion chamber having cooling fluid passages therein, each said section extending along one side of and over said orifice plate.

3. A burner for drying additions to a running web comprising elongated sections and means to connect said sections together forming a closed body with a longitudinally extending flame orifice, said body having therein a fuel chamber, an intermediate chamber and a combustion chamber having said orifice therein, said body forming walls for said chambers; an orificed partition between said fuel chamber and intermediate chamber, an orifice plate between said intermediate chamber and combustion chamber, one wall of said intermediate chamber comprising a baffle extending longitudinally continuously and transversely substantially between said partition and plate to break the direction of the line of flow of fuel between the orifices in the partition and plate, said sections forming the combustion chamber comprising two members, one extending along each side of and over the orifice plate, and end plates attached to said members, closing the ends of the combustion chamber.

4. A burner for drying additions to a running web comprising elongated sections and means to connect said sections together forming a closed body with a longitudinally extending flame orifice, said body having therein a fuel chamber, an intermediate chamber and a combustion chamber having said orifice therein, said body forming walls for said chambers; an orificed partition between said fuel chamber and intermediate chamber, an orifice plate between said intermediate chamber and combustion chamber, one wall of said intermediate chamber comprising a baffle extending longitudinally continuously and transversely substantially between said partition and plate to break the direction of the line of flow of fuel between the orifices in the partition and plate, said sections forming the combustion chamber comprising two members, one extending along each side of and over the orifice plate, and end plates attached to said members, closing the ends of the combustion chamber, one of said end plates having an ignition means therein initially exposed to the fuel therein to ignite the same.

5. A burner for drying additions to a running web comprising elongated sections and means to connect said sections together forming a closed body with a longitudinally extending flame orifice, said body having therein a fuel chamber, an intermediate chamber and a combustion chamber having said orifice therein, said body forming walls for said chambers; an orificed partition between said fuel chamber and intermediate chamber, an orifice plate between said intermediate chamber and combustion chamber, one wall of said intermediate chamber comprising a baffle extending longitudinally continuously and transversely substantially between said partition and plate to break the direction of the line of flow of fuel between the orifices in the partition and plate, the area of the orifices in the plate being less than the area of the orifices in the partition, whereby a pressure is built up in the intermediae chamber of undirected fuel.

6. A burner for drying additions to a running web comprising elongated sections and means to connect said sections together forming a closed body with a longitudinally extending flame orifice adapted to be placed transverse to the running web, said body having therein a fuel chamber, an intermediate chamber and a combustion chamber having said orifice therein, said body forming walls for said chambers, end plates extending between said sections to close the combustion chamber at its ends; an orificed partition between said fuel chamber and intermediate chamber, an orifice plate between said intermediate chamber and combustion chamber, said partition being angularly disposed with respect to said plate, one wall of said intermediate chamber comprising a baffle extending longitudinally continuously and transversely substantially between said angularly disposed partition and plate to break the direction of the line of flow of fuel between the orifices in the partition and plate, said sections forming the sides of the combustion chamber comprising two members, one extending along each side of the orifice plate and having a face directed outwardly from the combustion chamber, the faces together forming a broad, substantially concave V-shaped surface whereby the flame from said combustion chamber is flattened between said faces and the adjacent web.

7. An ink drying burner comprising elongated sections and means to connect said sections together forming a closed body with a longitudinally extending flame orifice, said body having therein a fuel chamber, an intermediate chamber and a combustion chamber, said body forming walls for said chambers, an orifice plate between said intermediate chamber and combustion chamber, a partition, angularly disposed with respect to said plate, between said fuel and intermediate chambers having laterally directed orifices therein, valves in said orifices to control the flow of fuel therethrough, one wall of said intermediate chamber constituting a longitudinally extending baffle substantially at right angles to the flow of fuel from the valve controlled orifices from the fuel chamber and breaking the direct flow of fuel to the orifice plate.

8. A burner for drying additions to a running web comprising a pair of elongated sections and means to laterally connect said sections together forming a closed body having a fuel slot extending longitudinally in one side thereof, said slot being in one of said sections, an orifice plate in said fuel slot, said body having therein a fuel chamber and an intermediate chamber, the latter being formed in part by said orifice plate, said body forming walls for said chambers, and orificed partition angularly disposed with respect to said plate between said chambers, one wall of said intermediate chamber comprising a baffle extending longitudinally continuously and transversely substantially between said angularly disposed partition and plate to break the direction of the line of flow of fuel between the orifices in the partition and plate members forming a pair of side walls extending upwardly from and over the edges of said orifice plate, and means to clamp said wall members to said fuel slot section, thereby clamping said orifice plate in place, said orifice plate and side walls forming a combustion chamber.

WILLIAM WALLACE KEMP.
HARTWIG MILLARD HANSON.

REFERENCES CITED

The following references are of record in the file of this patent:

UNITED STATES PATENTS

| Number | Name | Date |
|---|---|---|
| 1,830,287 | Ohlin | Nov. 3, 1931 |
| 2,203,087 | Hanson | June 4, 1940 |
| 2,294,748 | Hanson | Sept. 1, 1942 |
| 2,333,381 | Kelly et al. | Nov. 2, 1943 |